United States Patent [19]

Danzig

[11] 4,368,244

[45] * Jan. 11, 1983

[54] ZINC ELECTRODE FOR USE IN RECHARGEABLE ELECTROCHEMICAL CELLS

[75] Inventor: Ivan F. Danzig, Gainesville, Fla.

[73] Assignee: General Electric Company, Gainesville, Fla.

[ * ] Notice: The portion of the term of this patent subsequent to Jul. 28, 1998, has been disclaimed.

[21] Appl. No.: 245,599

[22] Filed: Mar. 19, 1981

Related U.S. Application Data

[63] Continuation of Ser. No. 158,484, Jun. 11, 1980, abandoned.

[51] Int. Cl.$^3$ ............................................. H01M 10/30
[52] U.S. Cl. .................................... 429/217; 429/230; 429/231; 429/223
[58] Field of Search .............................. 429/229-232, 429/206, 217, 223; 252/182.1

[56] References Cited

U.S. PATENT DOCUMENTS

| | | | |
|---|---|---|---|
| 2,738,375 | 3/1956 | Schlotter | 429/231 X |
| 2,865,974 | 12/1958 | Scheuerte et al. | 429/231 |
| 2,987,567 | 6/1961 | Freas et al. | 429/229 |
| 3,208,880 | 9/1965 | Bode et al. | 429/206 |
| 3,226,260 | 12/1965 | Drengler | 429/136 |
| 3,236,695 | 2/1966 | Horowitz | 429/206 |
| 3,245,839 | 4/1966 | Rosser et al. | 429/206 |
| 3,476,601 | 11/1969 | Berger et al. | 429/218 |
| 3,485,673 | 12/1969 | Jost | 429/54 |
| 3,493,434 | 2/1970 | Goodkin | 429/231 |
| 3,505,113 | 4/1970 | Merten et al. | 429/51 |
| 3,615,830 | 10/1971 | Johnson | 429/206 |
| 3,617,592 | 11/1971 | Arrance et al. | 264/61 |
| 3,816,178 | 6/1974 | Maki et al. | 429/206 |
| 3,853,625 | 12/1974 | Louzos | 429/229 |
| 3,870,564 | 3/1975 | Takamura et al. | 429/190 |
| 4,091,181 | 5/1978 | Merritt, Jr. | 429/231 |
| 4,091,193 | 5/1978 | Horowitz et al. | 429/219 |
| 4,197,635 | 4/1980 | Bilhorn | 429/229 X |
| 4,281,047 | 7/1981 | Danzig | 429/217 |

*Primary Examiner*—Anthony Skapars
*Attorney, Agent, or Firm*—Morgan, Finnegan, Pine, Foley & Lee

[57] ABSTRACT

An improved zinc electrode for use in rechargeable nickel-zinc electrochemical cells having greatly enhanced cycle life is disclosed, which comprises in admixture Zn, ZnO, HgO and an organic liquid binder produced via the reaction of diacetone acrylamide (DAA) and acrylic acid, which mixture has been formed into a paste and uniformly applied to a suitable current collector, wherein the ZnO component has an average surface area of about 9–10 m$^2$/gr and contains about 0.001 to 0.002 percent by weight Cd and about 0.001 to 0.002 percent by weight Pb.

16 Claims, No Drawings

ZINC ELECTRODE FOR USE IN RECHARGEABLE ELECTROCHEMICAL CELLS

CROSS-REFERENCE TO RELATED APPLICATION

This application is a continuation of application Ser. No. 158,484, filed June 11, 1980, now abandoned.

This invention also relates to a novel rechargeable nickel-zinc electrochemical cell having greatly enhanced cycle life wherein the zinc electrode comprises in admixture Zn, ZnO, HgO and an organic liquid binder produced via the reaction of diacetone acrylamide (DAA) and acrylic acid, which mixture has been formed into a paste and uniformly applied to a suitable current collector, wherein the ZnO component has an average surface area of about 9–10 $m^2/gr$ and contains about 0.001 to 0.002 percent by weight Cd and about 0.001 to 0.002 percent by weight Pb.

BACKGROUND OF THE INVENTION

The utilization of zinc electrodes in rechargeable nickel-zinc electrochemical cells and methods for their preparation are well known. Nevertheless, numerous problems exist involving the design and use of current-producing rechargeable electrochemical cells which derive in part from the phenomena of the redeposition of active materials upon one of the electrodes. Rechargeable electrochemical cells utilizing Zn/ZnO electrodes have heretofore been prone to exhibiting the growth of Zn dendrites during the charging phase of such cells.

For a typical nickel-zinc rechargeable cell, the number of charge/discharge cycles to which a given cell may be subjected will be limited by the above-mentioned dendrite formation problem which severely limits the useful life of such cells by effectively shorting the cell.

The dendrite formation problem in a typical rechargeable nickel-zinc electrochemical cell is understood to be caused by the fact that the zinc goes through a soluble species stage during each charge/discharge cycle. During the discharge period of each such cycle zinc hydroxide is formed.

Zinc hydroxide is highly soluble in alkaline systems, such as the electrolytic environment in which these cells operate, and, therefore, readily goes into solution in such an electrolytic medium. Eventually, the limit of solubility is reached and the zinc hydroxide precipitates out of solution. Upon recharging the cell, zinc is plated out of the saturated solution, thus allowing more zinc hydroxide to enter into the solution.

The problem revolves around the fact that the zinc which comes out of the saturated solution can, and often does, plate out at one point on the electrode surface and, when this occurs, a dendrite eventually forms, shorting the zinc/zinc oxide electrode to the nickel electrode.

A further problem which is encountered involves the fact that a "shape change" occurs in the crystal structure of the zinc which is deposited by plating from the saturated solution onto the surface of the zinc/zinc oxide electrode.

Ordinarily, a fine zinc deposit on the surface of the electrode is necessary in order to maintain a high surface area exposed to the electrolytic solution. When zinc hydroxide comes out of the solution and is subsequently redeposited on the surface of the electrode, as described above, coarse deposits of zinc may be formed which do not possess the requisite high surface area characteristics which are required, thus inherently limiting the useful capacity of the electrode and, therefore, of the rechargeable electrochemical cell.

It has now been discovered that superior zinc/zinc oxide electrodes for utilization in the construction of rechargeable nickel-zinc electrochemical cells may be prepared by employing a specific type of commercially available ZnO in the manufacture of such zinc electrodes.

It has been found that by employing a ZnO component having increased surface area over that of the accepted industry standard, the problem of decreased deposited zinc surface area is substantially diminished, and the problem of failure by dendrite shorting greatly decreased, thus allowing for a two-fold increase in the number of effective charge/discharge cycles for cells manufactured utilizing such improved electrodes.

DESCRIPTION OF THE INVENTION

According to the present invention there is provided an improved zinc electrode for use in rechargeable nickel-zinc electrochemical cells having greatly enhanced cycle life, which comprises in admixture Zn, ZnO, HgO and an organic liquid binder produced via the reaction of diacetone acrylamide (DAA) and acrylic acid, which mixture has been formed into a paste and uniformly applied to a suitable current collector, wherein the ZnO component has an average surface area of about 9–10 $m^2/gr$ and contains about 0.001 to 0.002 percent by weight Cd and about 0.001 to 0.002 percent by weight Pb.

The present invention also provides for a novel rechargeable nickel-zinc electrochemical cell having greatly enhanced cycle life wherein the zinc electrode comprises in admixture Zn, ZnO, HgO and an organic liquid binder produced via the reaction of diacetone acrylamide (DAA) and acrylic acid, which mixture has been formed into a paste and uniformly applied to a suitable current collector, wherein the ZnO component has an average surface area of about 9–10 $m^2/gr$ and contains about 0.001 to 0.002 percent by weight Cd and about 0.001 to 0.002 percent by weight Pb.

The preferred ZnO for utilization in preparing the zinc electrodes of the current invention is KADOX-25 zinc oxide, a commercially available material manufactured by the New Jersey Zinc Division of the Gulf & Western Natural Resources Group, or the equivalent.

KADOX-25 is advertised by the manufacturer as a specialty zinc oxide providing the unusual combination of high purity, high chemical reactivity and low capacity and is designed and advertised to meet the high purity and other rigid requirements of food-can manufacturers for use in can-sealing compounds and in organic coating applied to the interior of the cans. No advantages have heretofore been attributed to KADOX-25 in the area of any potential improvement to be achieved in the manufacture of zinc electrodes utilizing such materials.

KADOX-25 zinc oxide is advertised by the manufacturer to have the following physical properties and chemical analysis:*

*Source: NJZ Pigment Data Sheet re KADOX-25 zinc oxide.

| PHYSICAL PROPERTIES | | CHEMICAL ANALYSIS | |
|---|---|---|---|
| Mean Particle Size (microns) | 0.11 | ZnO | 99.7% |

-continued

| PHYSICAL PROPERTIES | | CHEMICAL ANALYSIS | |
|---|---|---|---|
| Surface Area (Sq. meters/gram) | 10 | PbO | 0.001 |
| Thru 325 Mesh Screen | 99.99% | CdO | 0.001 |
| Package Density (lbs/ft.$^3$) | 30 | $As_2O_3$ | <0.00005 |
| Specifications | ASTM D-79 | Total S as $SO_3$ | 0.003 |
| Fed. Spec. TT-P-463a (Grade B) | | $H_2O$ Soluble Salts | 0.02 |
| Food and Drug Administration | | Loss at 110° C. | 0.2 |
| | | Insoluble in HCl | <.01 |

The accepted industry standard for use in the preparation of zinc electrodes is USP-12 zinc oxide, also commercially available from the New Jersey Zinc Division of Gulf & Western Natural Resources Group.

It has been surprisingly discovered that rechargeable nickel-zinc electrochemical cells manufactured utilizing a zinc electrode which has been prepared employing KADOX-25 zinc oxide failed by dendrite shorting only after at least 28 charge/discharge cycles, as compared to failure at about 14 charge/discharge cycles for cells manufactured utilizing a zinc electrode prepared from USP-12 zinc oxide, which has heretofore been the industry's standard for such applications.

It is believed that the higher surface area of the KADOX-25 zinc oxide, equalling three times that of USP-12 zinc oxide, materially contributes to the enhanced cycle life demonstrated by cells employing zinc electrodes prepared from such materials. It is hypothesized that the higher surface area of the KAD0X-25 zinc oxide serves to effectively lower the current density required in the operation of the zinc electrode. The lower effective current density results in a more uniform deposition of the zinc metal on the zinc electrode and, therefore, reduces the formation of dendrites.

A further benefit to be derived in the utilization of KADOX-25 zinc oxide, lies in the substantial cost advantage KADOX-25 has over the present industry's stand, USP-12.

The zinc electrodes, as well as the nickel-zinc electrochemical cells which are manufactured using such electrodes, of the present invention may be manufactured via a variety of known conventional methods all of which are well known to those skilled in the art and require no further elaboration here.

DESCRIPTION OF THE PREFERRED EMBODIMENTS

The following examples will serve to illustrate the present invention and are set forth for illustrative purposes only and are not to be construed as limiting the scope of the invention.

EXAMPLES I-II

Physical and chemical analyses were undertaken on USP-12 zinc oxide and KADOX-25 zinc oxide, in order to substantiate the published literature values, and to provide a consistent basis for comparison.

Table 1 sets forth the results of analyses undertaken.

Scanning electron micrographs (SEM) were also prepared from samples of both USP-12 and KADOX-25 in order to determine their particle structure. It has been determined that USP-12 and KADOX-25 are both composed of similar shaped particles which were somewhat cubic to amorphous with some crystallinity evident.

Based upon the indicated physical and chemical characteristics, it is hypothesized that the increased cycle life which is displayed by electrochemical cells utilizing electrodes prepared from KADOX-25 over those prepared from USP-12, is the effective result of the increased surface area of the KADOX-25 zinc oxide. Consequently, a zinc electrode prepared using a given weight of KADOX-25, or the equivalent, can be effectively operated, during cell charging, at less than one half of the current density of a similar cell prepared using the same weight of USP-12 zinc oxide. The lower level of current density lessens the possibility of the occurrence of non-uniform current densities and, therefore, reduces the formation of dendrites thus increasing cycle life.

TABLE 1

| CHEMICAL ANALYSIS OF ZINC OXIDES | | | | |
|---|---|---|---|---|
| Examples | ZnO Type | % by Weight | | | Surface Area ($m^2$/gr) |
| | | Cd | Pb | Zn | |
| I | USP-12 | 0.011 | — | Remainder | 4.0 |
| II | KADOX-25 | 0.0018 | 0.0017 | Remainder | 9.2 |

EXAMPLES III-IV

Zinc electrodes were fabricated using USP-12 zinc oxide and KADOX-25 zinc oxide, in the proportions indicated in the attached Table 2, by weighing out and dry-mixing the Zn, ZnO and HgO to which water and an organic liquid binder, prepared from the reaction product of diacetone acrylamide (DAA) and acrylic acid, were added to yield a resultant mixture of uniform paste-like consistency. This mixture was uniformly applied to a suitable current collector, i.e. expanded silver screen, and the resulting electrode air dried in a forced convection air oven at 120° to 140° F. for 1 to 16 hours. The electrode was then incorporated into a rechargeable nickel-zinc electrochemical cell consisting of two nickel electrodes between which the zinc electrode and separators are sandwiched.

Table 2 sets forth typical compositions of zinc electrodes used for preparing and testing 60 AM nickel-zinc electrochemical cells. The electrodes produced according to the above procedure were 30 mils thick, had an area of 0.1577 $dm^2$ and a capacity of 2.034 Ah.

TABLE 2

| COMPOSITIONS OF ZINC ELECTRODES | | | | | | |
|---|---|---|---|---|---|---|
| EXAMPLE | | $Zn^1$ | ZnO (USP-12) | ZnO (KADOX-25) | $HgO^2$ | DAA Reaction Prod. | Total |
| III | gms | 0.5897 | 2.3513 | — | 0.0074 | 0.0602 | 3.0086 |
| | Wt % | 19.60 | 78.15 | — | 0.25 | 2.00 | 100 |
| IV | gms | 0.5897 | — | 2.3513 | 0.0074 | 0.0602 | 3.0086 |
| | Wt % | 19.60 | — | 78.15 | 0.25 | 2.00 | 100 |

Notes:
[1]Commercially available Grade 1222 from the New Jersey Zinc Company
[2]Red, Fisher

EXAMPLES V-VI

Rechargeable nickel-zinc electrochemical cells of identical characteristics, except for the type of ZnO utilized in preparing the zinc electrode, were constructed in accordance with the procedure set forth in Examples III and IV and tested under identical regimens.

Table 3 sets forth the results of testing for cells employing USP-12 zinc oxide and KADOX-25 zinc oxide in the preparation of the zinc electrode.

The results obtained, as set forth in Table 3, indicate that the end of charge voltage (EOCV), 30 AMP-min (AM) voltage and AM to 1.4 and 1.0 volts are all approximately equivalent for both cells as a function of cycle life prior to cell shorting.

It is, however, evident from these test results that the cycle life or number of cycles to cell shorting, for the two zinc oxides tested, are vastly different, since the USP-12 cell shorted at 14 cycles whereas the KADOX-25 cell shorted at 31 cycles.

The shorting mechanism in both cases was due to a successive build-up of dendritic zinc formed at the zinc electrode during charging which finally contacted the nickel electrode.

TABLE 3

CELL CYCLING TEST RESULTS[1,2]

| Example | ZnO Used | Cycles to Shorting | Fully Charged EOCV at C/5 Rate At Cycle 2 | 10 | 20 | 30 | 50% Discharged 30 AM Voltage at Cycle 2 | 10 | 20 | 30 | Capacity AM to 1.4 Volt at Cycle 2 | 10 | 20 | 30 | AM to 1.0 Volt at Cycle 2 | 10 | 20 | 30 |
|---|---|---|---|---|---|---|---|---|---|---|---|---|---|---|---|---|---|---|
| V | USP-12 | 14 | 1.890 | 1.910 | — | — | 1.619 | 1.637 | — | — | 54.9 | 58.2 | — | — | 57.4 | 61.3 | — | — |
| VI | KADOX-25 | 31 | 1.886 | 1.901 | 1.912 | 1.735 | 1.624 | 1.637 | 1.641 | 1.642 | 54.6 | 57.8 | 57.7 | 56.0 | 56.7 | 60.3 | 60.0 | 58.3 |

Notes:
[1]Separator system is Pellon Nylon/Celgard 3400 for both cells.
[2]Both cells were rated as 60 amp-minutes (AM)

Although the above examples illustrate various modifications of the present invention, other variations will suggest themselves to those skilled in the art in the light of the above disclosure. It is to be understood, therefore, that changes may be made in the particular embodiments described above which are within the fully intended scope of the invention as defined in the appended claims.

I claim:

1. A zinc electrode for use in rechargeable nickel-zinc electrochemical cells having greatly enhanced cycle life which comprises in admixture Zn, ZnO, HgO and an organic liquid binder produced via the reaction of diacetone acrylamide (DAA) and acrylic acid, which mixture has been formed into a paste and uniformly applied to a suitable current collector, wherein the ZnO component has an average surface area of about 9–10 $m^2$/gr.

2. A zinc electrode according to claim 1 wherein the ZnO component is KADOX-25 zinc oxide.

3. A zinc electrode according to claim 1 wherein the electrode comprises in admixture 19.6 percent by weight Zn, 78.15 percent by weight ZnO, 0.25 percent by weight HgO and 2.0 percent by weight DAA reaction product.

4. A zinc electrode according to claim 1 wherein the ZnO component contains small amounts of Cd and Pb.

5. A zinc electrode as claimed in claim 4 wherein the ZnO component contains about 0.001 to 0.002 percent by weight Cd and about 0.001 to 0.002 percent by weight Pb.

6. A zinc electrode according to claim 5 wherein the ZnO component has an average surface area of about 9.2 $m^2$/gr and contains 0.0018 percent by weight Cd and about 0.0017 percent by weight Pb.

7. A zinc electrode according to claim 5 wherein the ZnO component is KADOX-25 zinc oxide.

8. A zinc electrode according to claim 5 wherein the electrode comprises in admixture 19.6 percent by weight Zn, 78.15 percent by weight ZnO, 0.25 percent by weight HgO and 2.0 percent by weight DAA reaction product.

9. A rechargeable nickel-zinc electrochemical cell having greatly enhanced cycle life wherein the zinc electrode comprises in admixture Zn, ZnO, HgO and an organic liquid binder produced via the reaction of diacetone acrylamide (DAA) and acrylic acid, which mixture has been formed into a paste and uniformly applied to a suitable current collector, wherein the ZnO component has an average surface area of about 9–10 $m^2$/gr.

10. A rechargeable nickel-zinc electrochemical cell according to claim 9 wherein the ZnO component is KADOX-25 zinc oxide.

11. A rechargeable nickel-zinc electrochemical cell according to claim 9 wherein the electrode comprises in admixture 19.6 percent by weight Zn, 78.15 percent by weight ZnO, 0.25 percent by weight HgO and 2.0 percent by weight DAA reaction product.

12. A rechargeable nickel-zinc electrochemical cell according to claim 9 wherein the ZnO component contains small amounts of Cd and Pb.

13. A rechargeable nickel-zinc electrochemical cell according to claim 12 wherein the ZnO component contains about 0.001 to 0.002 percent by weight Cd and about 0.001 to 0.002 percent by weight Pb.

14. A rechargeable nickel-zinc electrochemical cell according to claim 12 wherein the ZnO component has an average surface area of about 9.2 $m^2$/gr and contains 0.0018 percent by weight Cd and about 0.0017 percent by weight Pb.

15. A rechargeable nickel-zinc electrochemical cell according to claim 12 wherein the ZnO component is KADOX-25 zinc oxide.

16. A rechargeable nickel-zinc electrochemical cell according to claim 12 wherein the electrode comprises in admixture 19.6 percent by weight Zn, 78.15 percent by weight ZnO, 0.25 percent by weight HgO and 2.0 percent by weight DAA reaction product.

* * * * *